United States Patent [19]
Qvarth et al.

[11] Patent Number: 6,086,290
[45] Date of Patent: Jul. 11, 2000

[54] MILLING TOOL HAVING CASSETTE-MOUNTED INSERTS ATTACHED TO A ROTARY SUPPORTING BODY

[75] Inventors: Ingemar Qvarth, Valbo; Lars-Erik Enquist, Sandviken, both of Sweden

[73] Assignee: Sandvik AB, Sandviken, Sweden

[21] Appl. No.: 09/172,293

[22] Filed: Oct. 14, 1998

[30] Foreign Application Priority Data

Oct. 15, 1997 [SE] Sweden ................................ 9703746

[51] Int. Cl.⁷ .................................................. B23C 5/24
[52] U.S. Cl. .......................... 407/38; 407/39; 407/45; 407/47
[58] Field of Search .................. 407/35, 36, 38, 407/40, 41, 43, 44, 45, 46, 47, 48, 37, 39

[56] References Cited

U.S. PATENT DOCUMENTS

| | | |
|---|---|---|
| Re. 21,068 | 5/1939 | Miller ..................................... 407/35 X |
| 1,197,136 | 9/1916 | Lovejoy ..................................... 407/38 |
| 1,719,337 | 7/1929 | Miller ......................................... 407/38 |
| 1,884,158 | 10/1932 | Olson . |
| 1,964,130 | 6/1934 | Miller ......................................... 407/41 |
| 2,037,642 | 4/1936 | Scribner ................................. 407/41 X |
| 2,306,798 | 12/1942 | Benninghoff ........................... 407/41 X |
| 2,501,293 | 3/1950 | Sheridan . |
| 3,214,825 | 11/1965 | Williams . |
| 3,501,822 | 3/1970 | Williams . |
| 5,102,268 | 4/1992 | Mitchell ................................ 407/46 X |
| 5,529,439 | 6/1996 | Werner et al. ............................. 407/39 |
| 5,667,343 | 9/1997 | Hessman et al. ...................... 407/46 X |

Primary Examiner—Henry W. H. Tsai
Attorney, Agent, or Firm—Burns, Doane, Swecker & Mathis, L.L.P.

[57] ABSTRACT

A milling tool includes a rotatable supporting body having detachable cassettes upon which cutting inserts are mounted. The cutting inserts are provided with cutting edges. Two serrated surfaces are provided in order to connect the individual cassette with the supporting body. A first of the two serrated surfaces is located upon the periphery of the supporting body and faces outwards from the supporting body, while the other serrated surface is formed at an inner side of the cassette.

9 Claims, 3 Drawing Sheets

MILLING TOOL HAVING CASSETTE-MOUNTED INSERTS ATTACHED TO A ROTARY SUPPORTING BODY

RELATED INVENTION

This invention is related to that disclosed in concurrently filed U.S. Ser. No. 09/172,295

TECHNICAL FIELD OF THE INVENTION

The present invention relates to a milling tool comprising a supporting body rotatable around a central geometric axis, said supporting body having an endless circumferential surface which extends between opposite end surfaces, several mutually separated cassettes being detachably mounted upon said circumferential surface, each cassette including a detachable cutting insert having two cutting edges.

PRIOR ART

A milling tool of the type defined above is previously known from Werner et al. U.S. Pat. No. 6,529,439. Similar milling tools, using wedge bodies for clamping of the cutting inserts, are previously known from U.S. Pat. Nos. 2,037,642, U.S. Pat. No. 3,214,825 and U.S. Pat. No. 3,501,822. Common for all these known tools is that the cutting inserts are accommodated in and project from radial grooves or recesses that open in the circumferential surface of the supporting body.

It should be possible to adjust all of the cutting inserts of a milling tool in very precise working positions. In practice it is a question of tolerances in the magnitude of 1/100 mm or less. Regarding such milling tools as corner milling cutters and facemilling cutters it is vital that the edges of all of the cutting inserts during work are fine-adjusted, not only in one single plane perpendicular to the axis of rotation of the supporting body, but also at an exactly defined radial distance from the axis of rotation.

When manufacturing rotatable milling tools it is a general ambition to maximize the machining capacity. For this purpose the supporting body should—for a given diameter—be equipped with the largest possible number of cutting inserts, since the strains on each individual cutting insert become less as the number of cutting inserts increases. In other words the milling tool is allowed to work at a higher machining speed by increasing the number of cutting inserts. Another important factor of the milling tool is the weight of the supporting body. The lighter the material of the supporting body, the faster the starting and stop-ping sequences; that is of particular importance in connection with milling of materials that are easy to work. Also, a tendency toward harmful vibrations is also counteracted if the supporting body has a low weight. Aluminum would be such a lightweight material.

In connection with the milling tools, previously known from the abovementioned patents, there must be provided, between each pair of adjacent recesses for the cutting inserts, a considerable amount of material in the supporting body itself in order to make the peripheral area of the supporting body resistant to the sometimes rather large tangential forces that are applied to the periphery of the supporting body via the cutting inserts and the cassettes. Usually those skilled in the art calculate that the tangential extension of the individual section of material between two adjacent recesses should be at least as large as the tangential extension or width of the recess. This means that the number of cutting inserts that can be mounted upon the periphery of the supporting body is restricted in an unsatisfactory way.

Steel has normally been chosen as the material of the supporting body of previously known milling tools. This material has the advantage that it is impact resistant; meaning that the outwards exposed sections of material disposed between each pair of outwards projecting cutting inserts are given a good ability to resist the mechanical stresses that arise from hot machined chips thrown against said exposed sections. However, a disadvantage in connection with steel is that this material has a relatively high density. This means, due to the fact that the supporting body constitutes the major part of the entire volume of the milling tool, that the milling tool as a whole becomes heavy. A consequence of a heavy weight of the tool is that the machining speed becomes limited. Further, the handling of the milling tool is of course complicated in connection with mounting or dismounting the tool relative to the associated milling machine.

As regards the previously known milling tools according to the abovementioned patent documents, it should be pointed out that the means for adjustment of the cutting inserts in precise working positions are rather complicated; meaning that the adjustment work in connection with the positioning is time-consuming.

SUMMARY AND OBJECTS OF THE INVENTION

The present invention aims at overcoming the abovementioned shortcomings of previously known milling tools and providing an improved milling tool.

A primary object of the invention is thus to create a milling tool that can be equipped with a large number of cutting inserts for a given diameter, with the ultimate object of making an increased machining speed possible.

A further object is to provide a milling tool having a supporting body that, when needed, may be manufactured from a material of low density, e.g., aluminum, in order to reduce the weight of the supporting body and thus facilitate mounting and dismounting work and reduce the risk of vibrations.

Still a further object of the invention is to create a milling tool having a cutting insert that can be fine-adjusted in a simple and time-saving way.

At least the primary object of the invention is attained by a milling tool which comprises a supporting body rotatable about a central axis. The supporting body includes an outer endless peripheral face forming a plurality of first serrated surfaces arranged circumferentially about the axis. A plurality of cassettes is provided, each having a second serrated surface. Each cassette has its respective second serrated surface meshed with a respective first serrated surface. Each cassette carries a cutting insert having at least one cutting edge. Each of the first and second serrated surfaces comprises straight parallel ridges alternating with straight parallel grooves. The ridges and grooves extend parallel to the axis. Each of the first serrated surfaces forms an angle in the range of 65–90° relative to a radius of the supporting body. Each of the cassettes includes a recess for receiving a clamping screw which enables the cassette to be adjusted relative to the supporting body in a direction parallel to the axis when the clamping screw is in a loosened state.

The invention relies upon the concept of applying the cassettes on the outside of the circumferential surface of the supporting body, comparatively close to each other in order to that the cassettes cover the largest possible amount of the circumferential surface. By locating the cassettes close to each other on the outside of the circumferential surface, i.e., without accommodating them within any radial recesses, it is made possible not only to have a large number of cutting inserts mounted upon a supporting body of given diameter, but also to have the supporting body itself manufactured from a material having limited impact resistance. Therefore, in practice the supporting body may be manufactured from aluminum or another light material, even as the cassettes are manufactured from steel having essentially higher mechanical resistance than aluminum. The steel then protects the material of the supporting body.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
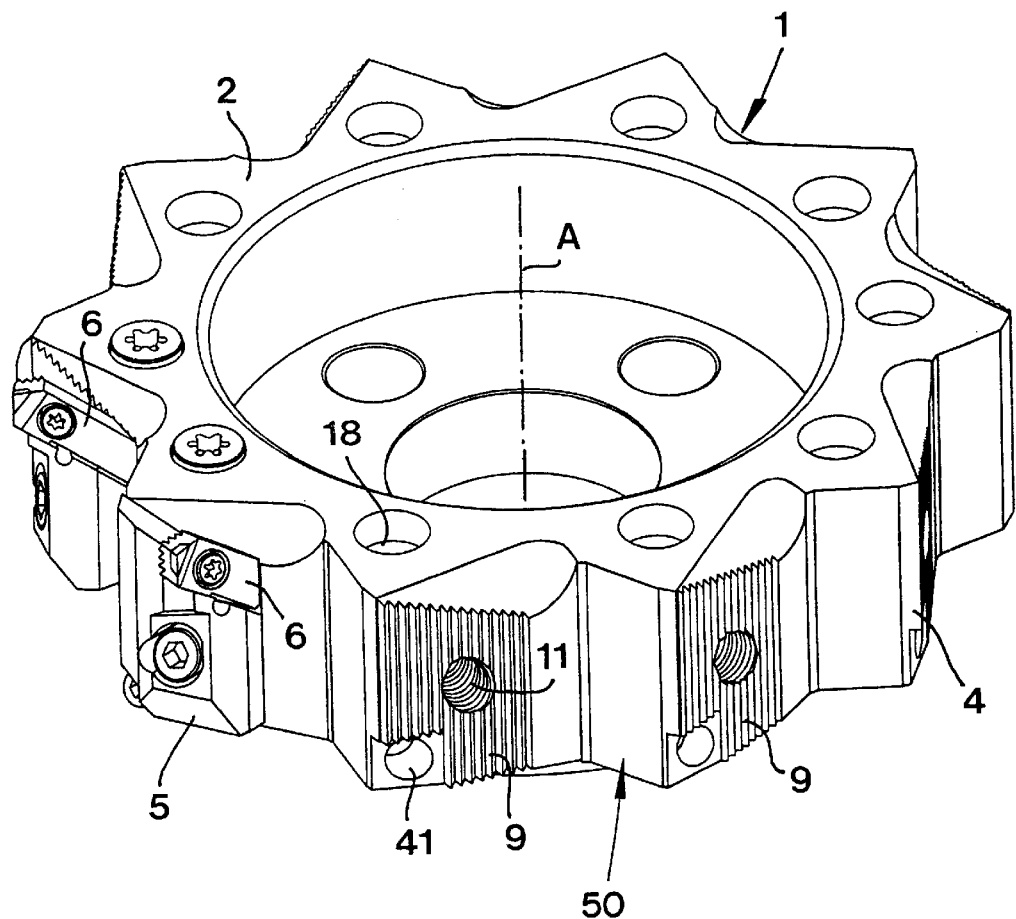
FIG. 1 is a perspective view of a milling tool according to the invention, said milling tool being illustrated with all the cassettes, except two, removed from the supporting body.

As will be apparent from the foregoing description, the present invention uses means that enables a quick and simple fine adjustment of the cutting inserts in both the axial and the radial directions.

The milling tool illustrated in FIGS. 1–4 comprises a supporting body 1 that is rotatable around a central geometrical axis A, said supporting body 1 having a cylindrical basic shape (said supporting body often also being designated as a milling cutter head). Between opposite, planar end surfaces 2, 3 (see both FIGS. 1 and 2) there is an endless, circumferential peripheral face 4 which does not constitute a cylindric or smooth face, but rather has the character of an envelope surface. Upon said envelope face or circumferential face 4 several cassettes 5 are provided. Each cassette 5 supports in turn a cutting insert 6. The cutting is performed according to the embodiment by a corner cutter and consequently each cutting insert 6 includes two cutting edges 7, 8 which form the corner. The edge 8 forms a major cutting edge extending parallel to the axis A of rotation, and the edge 7 forms a minor cutting edge. As regards the minor cutting edge 7 it should be pointed out that said edge 7 comprises a short so called wiper flat, that extends exactly perpendicular relative to the major cutting edge 8, while a portion of the edge 7 extending towards the center of the milling tool forms a somewhat inclined clearance portion. However, for scale reasons it is not possible to clearly distinguish the wiper flat or the minor cutting edge from the clearance portion.

So far described the disclosed milling tool is in all essentials previously known.

Characteristic for the milling tool according to the invention is that the individual cassette is connectable with the supporting body via a pair of cooperating, serrated surfaces 9, 10, a first one of said surfaces 9 being provided at the circumferential face of the supporting body and the second one at an inner side of the cassette. In a previously known way each serrated surface comprises several oblong, axially oriented and parallel ridges separated by grooves. The ridges and grooves extend parallel to the axis A. The ridges of one serrated surface engage the grooves of the other serrated surface. Although it is possible to locate the first serrated surface 9 exactly tangential relative to the axis A, i.e. perpendicular to an imaginary radius from the axis of rotation of the supporting body, said serrated surface 9 may in practice be located at an arbitrary angle, within the range of 65–90°, relative to the radius as viewed in a direction parallel to the axis A (e.g. see the angle β shown in another preferred embodiment disclosed in connection with FIG. 5, suitably 70–85° or most preferably about 75°. The inclination of the serrated surface 9 may be either negative or positive. In the embodiment according to FIGS. 1–4 serrated surfaces 9 having a positive inclination angle are shown, while FIG. 5 exemplifies an embodiment having a negative inclination angle β relative to a radius R. The serrated surface 9 should extend along a major portion of the axial extension of the supporting body (i.e. the entire distance between opposite planar surfaces 2, 3) and have a width or tangential extension that 10 corresponds to the width of the cassette 5. Simultaneously the serrated surface at the inner side of the cassette should extend along the entire length as well as the entire width of the cassette.

Figure 2:
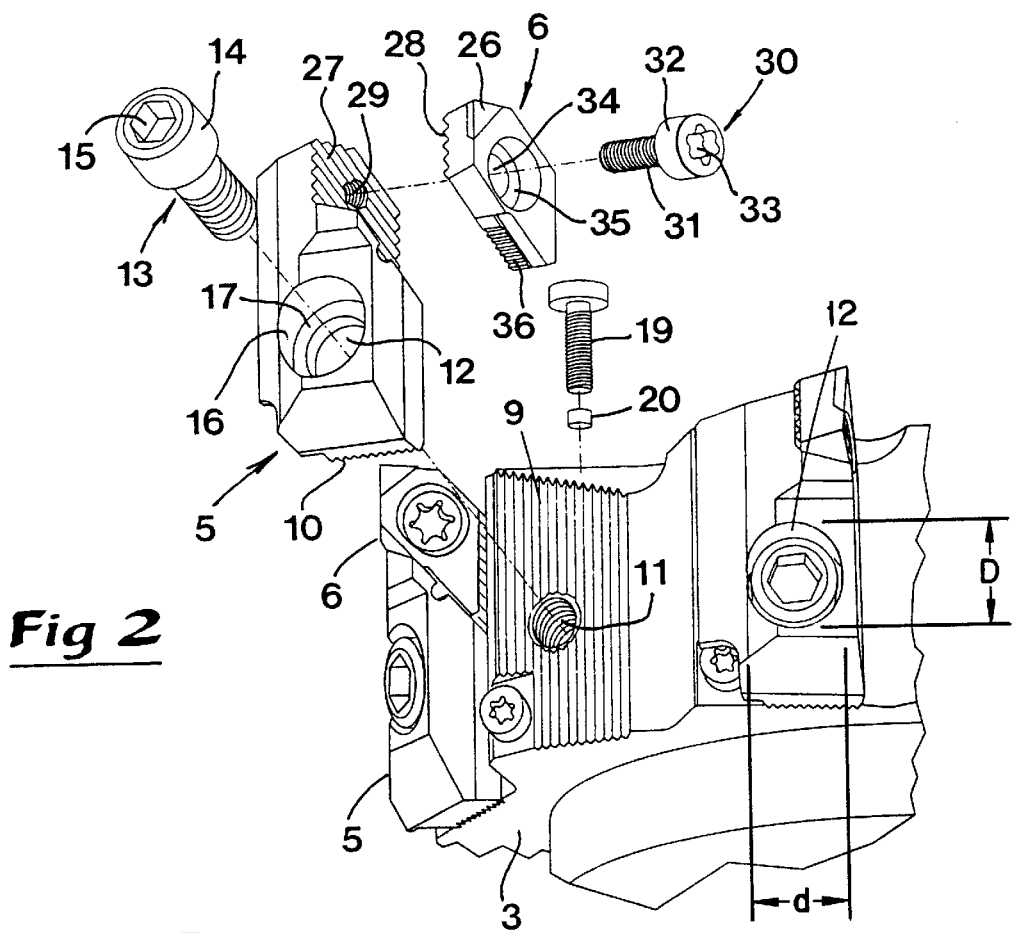
FIG. 2 is a perspective exploded view illustrating a portion of the supporting body and a cassette and a cutting insert being detached from the supporting body.

For each cassette a threaded hole 11 is provided in the supporting body 1, said threaded hole 11 opening in the serrated surface 9. Further, in the cassette 5 a through hole 12 is provided for receiving a clamping screw 13 that is to be tightened in the threaded hole 11. In the embodiment a screw is used that apart from a threaded shaft includes a head 14 having a recessed grip 15 for an Allen key. The hole 12 has on one hand a narrow inner section through which the shaft of the screw is allowed to pass and on the other hand a wider outer section that provides a recess 16 adapted to accommodate the head 14 of the screw. The bottom 17 of the recess provides an abutment surface against which the head of the screw may be tightened. It is characteristic for the hole 12 to be of an oblong shape extending parallel to the axis A, i.e. dimension D in FIG. 2 is greater than dimension d, in order to allow the cassette, as long as the screw is not finally tightened, to be displaced to some degree relative to the screw in the axial direction of the supporting body. Since the ridges 9, 10 are parallel to the axis A, as noted above, the dimension D is parallel to the ridges 9, 10.

Among persons skilled in the art it is well known that components which are detachably mounted upon a rotatable supporting body constitute a latent security risk because under unfortunate circumstances said components may be loosened from the supporting body and thrown off at high speed if the supporting body is driven at a high speed of rotation. Although it is sufficient to tighten the clamping screw 13 by a predetermined torque, a further measure has been taken, in connection with the milling tool according to the invention, by providing a securing of the clamping screw against centrifugal forces. Thus for each cassette and clamping screw a secondary, threaded hole 18 is formed in the supporting body 1. This secondary hole opens on one hand in the planar end surface 2 and on the other hand in the primary hole 11 of the clamping screw 13. In the secondary hole there may be inserted on one hand an auxiliary screw 19 (said screw being accessible from the outside), and on the other hand a press body 20 that upon tightening of the auxiliary screw in the hole 18 is urged against the threaded shaft of the clamping screw 13. In practice the press body 20 is preferably made of copper or other material that is soft in relation to steel, that will not damage the thread of the clamping screw. Since the auxiliary screw 19 is not subjected to any centrifugal forces it will, after tightening, guarantee a satisfactory securing of the clamping screw 13 even if said screw is subjected to high centrifugal forces.

In accordance with a preferred embodiment of the invention a special mechanism is provided in order to facilitate fine axial adjustment of the cassette 5 relative to the supporting body 1. Said mechanism may be realized in different ways, but is, in the embodiment, in the shape of a screw having on one hand a threaded shaft (not visible) that may be engaged in a threaded hole 41 (see FIG. 1) of the supporting body and on the other hand a head 21 having an outwards facing grip 22 for receiving a multi-lobed key. It is characteristic of this screw that the envelope surface of the head is asymmetric in relation to the center axis of the shaft. For instance, the envelope surface may be cylindrical and the head generally eccentric relative to the shaft. The envelope surface could also have an oval shape. As is evident from FIG. 4 the envelope surface of the head of the screw is located in contact with a transverse abutment surface 23 of the cassette 5. When the screw is subjected to a turning movement the head is able to displace the cassette by small or fine axial movements.

A second surface 24 extends at an angle to the abutment surface 23 that together with said second surface 24 define a corner recess in the cassette. In the area of this corner recess the cassette has a projecting flange portion 25 that partly overlaps and covers the circumferential (radially facing) portion of the screw head 21. By the presence of this flange portion 25 the screw is secured against centrifugal forces. In other words said screw may not be thrown from the milling tool even if said tool is rotated at high speed.

In the embodiment the cutting insert 6 consists of a steel body having an integrated smaller body 26 of a material having extraordinary high hardness and high wear resistance, e.g., a material that wholly or partly consists of diamond or cubic boron nitride. The above-mentioned cutting edges 7, 8 are formed upon said body 26 constituting the actual edge of the cutting insert. As previously pointed out the exemplified cutting inserts are adapted for corner milling, said cutting edges 7, 8 extending perpendicular relative to each other.

The cutting insert 6 is connectable with the cassette by means of a second pair of serrated surfaces 27, 28 of which a first one 27 is provided at a free end of the cassette while the other one 28 is provided at an inner side of the cutting insert 6. In conformity with the above-mentioned serrated surfaces 9, 10, said serrated surfaces 27, 28 comprise oblong ridges separated by grooves. The serrated surface 28 preferably extends along the entire inner side of the cutting insert 6. The serrated surface 27 has a size that essentially corresponds to the size of the serrated surface 28. In the serrated surface 27 there opens a threaded hole 29 for receiving a clamping screw 30, said clamping screw 30 being intended to secure the cutting insert to the cassette. Apart from a threaded shaft 31, said screw includes a head 32 having an outwards facing grip 33 for a suitable key. In the cutting insert 6 a through hole 34 is provided that, like the hole 12, is of an oblong shape in order to enable a certain displacement of the cutting insert relative to the screw. Also in this case the hole has a recess for the head of the screw, which head may be tightened against an annular abutment surface 35 at the bottom of the recess.

The ridges and the grooves of the second pair of serrated surfaces 27, 28 are inclined at an angle of 45° relative to the ridges and grooves of the first pair of serrated surfaces 9, 10. This means that the cutting insert 6 is displaceable in a direction oriented exactly at an angle of 45° relative to an imaginary reference plane P extending perpendicularly to the axis A. In other words, 45° constitutes one half of the setting angle of the cutting edges 7, 8. If the setting angle between said cutting edges differs from 90° (either an acute or an obtuse angle) the ridges of the serrated surfaces are inclined accordingly. For example, if the setting angle between the cutting edges were 120°, then the ridges of the serrated surfaces would be oriented at an angle of 60° (half of the setting angle) relative to the imaginary reference plane P.

Figure 3:
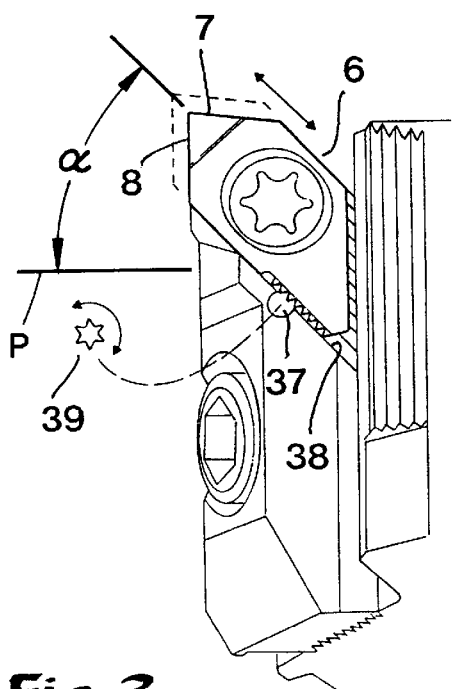
FIG. 3 is a perspective partial view illustrating how the cutting inserts are adjusted relative to an associated cassette.
Figure 4:
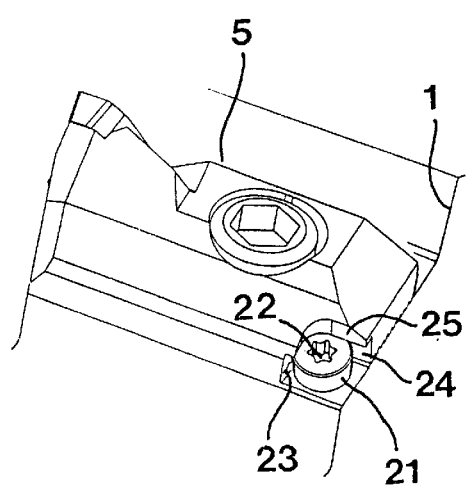
FIG. 4 is a partial perspective view showing a detail of the cassette.

As is evident from FIGS. 2 and 3 the cutting insert 6, along one of its longitudinal sides, has a set of teeth 36 that, in a mounted position of the cutting insert, is facing a partially circular recess 37 in a wall surface 38 that in the cassette defines a seat for the cutting insert 6. As is indicated at 39 a multi-lobed key may be introduced in the recess 37 in order to engage the set of teeth 36. It should be obvious that the cutting insert is displaceable to and from relative to the cassette by turning this key.

The fine adjustment of each of the cutting inserts 6 of the milling tool is effected in the following way: After fastening of the cassette and clamping of the cutting inserts upon the supporting body, the two screws 13, 30 are initially only slightly tightened in the respective threaded hole (i.e., they are relatively loose). In a first step the cutting inserts are adjusted in the radial direction.

This is effected by having the cutting insert 6 displaced relative to the associated cassette by means of the key 39. More precisely, the cutting inserts are displaced either outwards or inwards at an angle of 45° relative to the longitudinal direction of the cassette. When all of the cutting inserts have been adjusted and calibrated, i.e. they are positioned (within a tolerance area of e.g. 0.01 mm) with the cutting edge 8 at exactly the desired radial distance from the axis of rotation of the supporting body, the screw 30 is finally tightened. At this stage, with the clamping screw 13 of the cassette still only slightly tightened, the cutting insert may not be displaced in the radial direction relative to the supporting body. In the next step the cutting insert is adjusted also in the axial direction. This is effected by means of the head 21 of the screw that upon turning enables axial displacement of the cassette by extreme fine movements. When the cassette has reached the exact desired axial position also the clamping screw 13 is finally tightened. In a finishing step the auxiliary screw 19 is, together with the press body 20, introduced into the secondary hole 18 in order to secure the clamping screw against centrifugal forces.

In the embodiment shown in FIG. 1, recesses 50, V-shaped in cross-sectioned, are provided between adjacent cassettes and respective serrated surfaces 9, said V-shaped recesses demanding a certain space. Nevertheless the cassettes are located essentially closer to each other than what is possible in connection with previously known milling tools that use radial recesses in order to accommodate radially projecting cutting inserts. In other words the supporting body or the milling cutter head 1 may be equipped with an increased number of cutting inserts for a given diameter.

Figure 5:
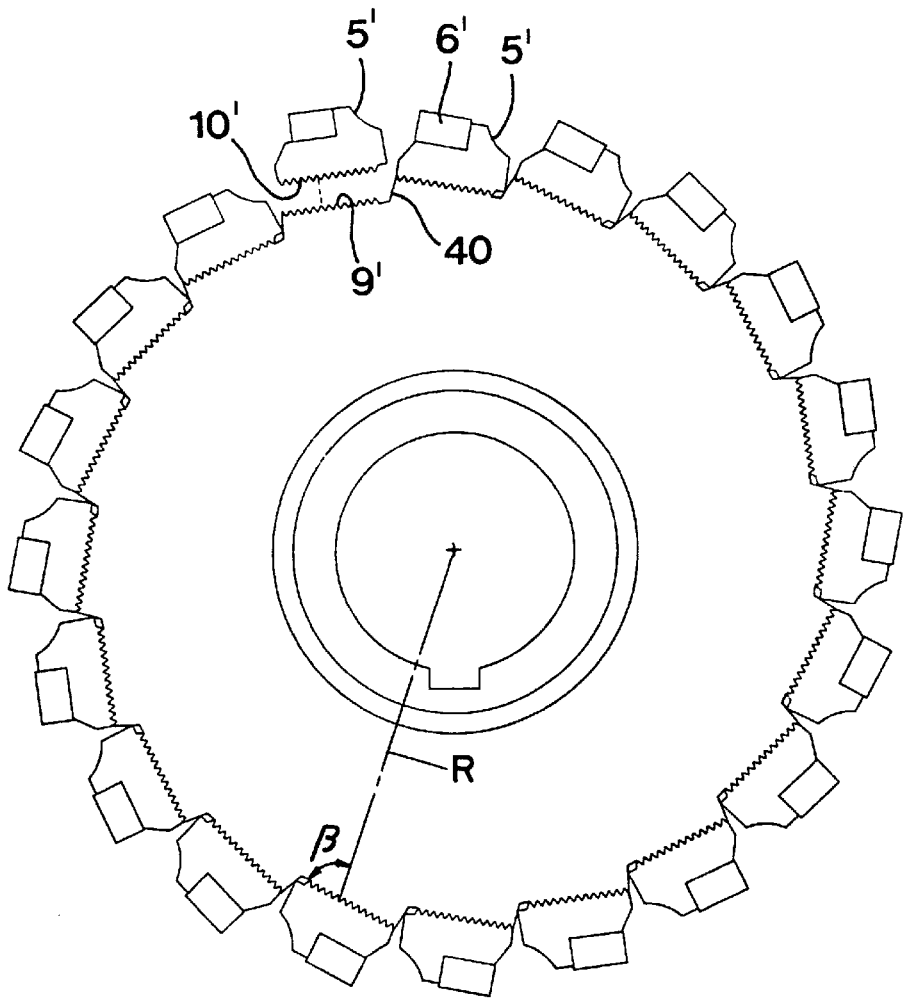
FIG. 5 is a top view of a milling tool according to an alternative embodiment of the invention.
Figure 6:
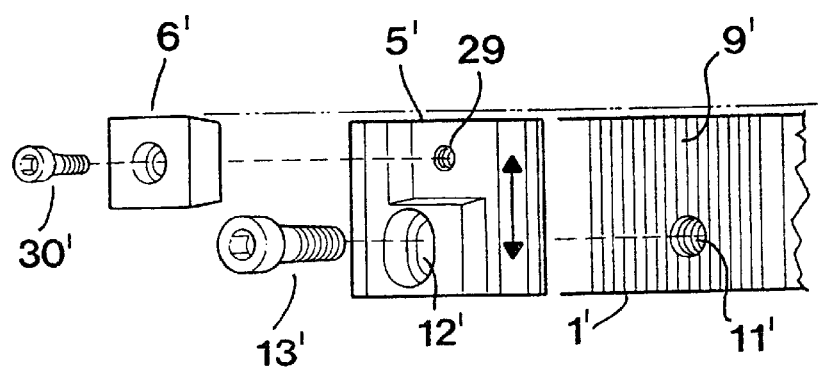
FIG. 6 is an exploded view illustrating a cassette and cutting inserts of the milling tool according to FIG. 5.

In FIG. 5 and 6 an alternative embodiment is shown, where the cassettes 5' are located immediately adjacent each other in such a way that the cassettes together in all essentials cover the entire periphery surface of the supporting body 11. In this case the serrated surfaces 9' extend at a negative angle β relative to an imaginary radius R from the axis of rotation of the milling tool, whereby short transition surfaces 40 are provided between forward and rear ends of adjacent serrated surfaces 9', said short surfaces 40 extending at a steep angle relative to the serrated surfaces.

In this embodiment it is especially preferable to manufacture the supporting body 1' from aluminum and the cassettes from steel. Since steel has a considerably higher impact resistance than aluminum, the supporting body is protected from an injurious effect from chips that are thrown out from the cutting inserts. Thus the cassettes together form an essentially complete covering and protective shield around the supporting body.

The cassette 5' is essentially analogous with the previously described cassette 5 as regards the possibility to precisely adjust the cassette in the axial direction. Since the cutting insert, in connection with a milling tool of the type depicted in FIGS. 5–6, does not need to be adjusted radially, said insert is secured to the cassette in one given position by means of one single clamping screw 30'. In this case the cutting insert 6' may comprise a conventional cemented carbide body that preferably is indexable.

A basic advantage of the milling tool according to the invention is that the supporting body, by the external and exposed location of the cassettes, can be equipped with a large number of cassettes for a given supporting body diameter. This external location of the cassettes is made possible by the use of the cooperating serrated surfaces on the inner side of the cassettes and the periphery of the supporting body since such serrated surfaces are able to absorb large tangential forces. The invention provides especially significant advantages when the cassettes are mounted immediately adjacent each other in the way that is exemplified in FIG. 5. In such cases the cassettes form a circumferential protective shield that makes it possible to use aluminum or other materials of low density having less impact resistance and less wear resistance. Further, the double set of serrated surfaces allows a simple and time-saving fine adjustment of the cutting inserts of the tool, said serrated surfaces extending at an angle relative to each other.

Feasible Modifications of the Invention

The invention is not solely restricted to the embodiments described above and disclosed in the drawings. Thus it is possible to use, instead of a screw having an asymmetric head, other mechanisms for the axial fine adjustment of the cassettes. It is even feasible to omit a fine adjustment mechanism and thus carry out the adjustment exclusively manually. Furthermore, it should be pointed out that the possibility of axial displacement of the cassette relative to the supporting body may be realized otherwise than by the aid of an oblong hole and a screw secured in the supporting body, said screw being axially immovable. It is instead feasible to use a screw having on one hand a threaded shaft that may be secured in a conventionally threaded hole in the cassette and on the other hand a head accommodated in an inner cavity of the cassette, and that a hole that extends out from the inner cavity is oblong in order to allow the screw, and thus the cassette, to move axially. It is further, especially in connection with large milling tools, feasible to secure the cassette by means of screws that are accessible from inside the cylindrical recess that is defined by the peripheral annular portion of the supporting body (see FIG. 1). Also the clamping screw 30 of the cutting insert 6 may be secured against centrifugal forces, for instance in the same way as the clamping screw 13 of the cassette.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A milling tool comprising a supporting body rotatable about a central axis, the supporting body including an outer endless peripheral face forming a plurality of first serrated surfaces arranged circumferentially about the axis; a plurality of cassettes each having a second serrated surface, each cassette having its respective second serrated surface meshed with a respective first serrated surface; each cassette carrying a cutting insert having at least one cutting edge; each of the first and second serrated surfaces comprising straight parallel ridges alternating with straight parallel grooves; the ridges and grooves extending parallel to the axis; each of the first serrated surfaces forming an angle in the range of 65–90° relative to a line extending radially from the axis of the supporting body and intersecting a center of the first serrated surface as viewed in a direction parallel to the axis; each of the cassettes including a through-hole aligned with a hole extending through the first serrated surface; and a clamping screw extending through the through-hole and disposed in the hole for securing the cassette to the supporting body, there being sufficient play between the clamping screw and the through-hole to enable the cassette to be adjusted relative to the supporting body in a direction parallel to the axis when the clamping screw is in a loosened state.

2. The milling tool according to claim 1 wherein the through-holes are elongated in a direction parallel to the ridges and grooves of the first and second serrated surfaces.

3. The milling tool according to claim 2 wherein each abutment surface is defined by a bottom surface of a respective through-hole, the head of a respective clamping screw disposed in the through-hole.

4. The milling tool according to claim 2 wherein the supporting body further includes a plurality of threaded secondary holes communicating with the threaded holes, secondary threaded screws threaded in the secondary holes; and press bodies disposed in respective ones of the secondary holes for being pressured against respective clamping screws by the secondary screws.

5. The milling tool according to claim 1 further including a displacing mechanism for displacing each cassette relative to the supporting body.

6. The milling tool according to claim 5 wherein the displacing mechanism for each cassette comprises an adjusting screw threadedly mounted in the supporting body; the adjusting screw having a head with an eccentric envelope surface arranged to bear against a face of the cassette to displace the cassette parallel to the axis in response to rotation of the adjusting screw.

7. The milling tool according to claim 6 wherein each cassette includes a projecting flange overlapping a radially outward facing portion of a respective adjusting screw to prevent the adjusting screw from being dislodged by centrifugal force.

8. The milling tool accordingly to claim 1 wherein each cutting insert has a third serrated surface; each cassette having a fourth serrated surface meshing with a respective third serrated surface; each of the third and fourth serrated surfaces defined by alternating straight parallel ridges and grooves; the ridges and grooves of the third and fourth serrated surfaces extending at an acute angle relative to a reference plane oriented perpendicular to the axis.

9. The milling tool according to claim 1 wherein the supporting body is formed of aluminum.

* * * * *